United States Patent [19]
Waller, Jr.

[11] Patent Number: 5,263,091
[45] Date of Patent: Nov. 16, 1993

[54] INTELLIGENT AUTOMATIC THRESHOLD CIRCUIT

[76] Inventor: James K. Waller, Jr., 741 Morgan Hill, Lake Orion, Mich. 48035

[21] Appl. No.: 849,274

[22] Filed: Mar. 10, 1992

[51] Int. Cl.$^5$ ............................................. H04B 15/00
[52] U.S. Cl. ......................................... 381/94; 381/106
[58] Field of Search ..................... 381/98, 106, 110, 94

[56] References Cited
U.S. PATENT DOCUMENTS

| | | | |
|---|---|---|---|
| 4,609,878 | 9/1986 | Rodgers | 381/106 |
| 4,696,044 | 9/1987 | Waller, Jr. | 381/106 |
| 4,809,337 | 2/1989 | Scholz et al. | 381/94 |
| 4,893,099 | 1/1990 | Waller, Jr. | 381/98 |
| 5,050,217 | 9/1991 | Orban | 381/94 |

*Primary Examiner*—Forester W. Isen
*Attorney, Agent, or Firm*—Catalano, Zingerman & McKay

[57] ABSTRACT

A circuit for conditioning an input signal containing audio and noise components is provided in which a first circuit branch is used for deriving a first DC signal proportionate to the decibel level of high band information in the input signal and a second circuit branch is used for deriving a second DC signal proportionate to the amplitude of the input signal. A preselected maximum threshold reference is provided when the second DC signal drops below a preselected threshold and also for a predetermined time period when the second DC signal rises above the preselected threshold. The first DC signal and the maximum threshold reference are used to provide a peak detector signal input which is maintained at a level equal to the most negative level of the first DC signal when the maximum threshold reference is not provided and at a level equal to the most positive level of the first DC signal but not greater than the preselected maximum threshold reference when the maximum threshold reference is provided.

22 Claims, 4 Drawing Sheets

HUSH I.S.P. AUTO THRESHOLD BANDPASS OUTPUT

INTELLIGENT AUTOMATIC THRESHOLD CIRCUIT

BACKGROUND OF THE INVENTION

This invention relates generally to an automatic threshold circuit for determining the optimal threshold level set-point for a signal processing device and can be applied specifically to applications for dynamic noise reduction, where the circuit will automatically determine the threshold set-point based on the relative level of background noise. The intelligent automatic threshold circuit can be applied to many types of signal processors and its advantages will specifically be demonstrated as used with non-complimentary noise reduction systems incorporating both dynamically-controlled filtering and downward expansion.

The setting of the threshold is one of the most crucial aspects of a properly functioning non-complimentary or single-ended noise reduction system, as an incorrectly set threshold produces very undesirable results. For example, if the threshold is set too high, the dynamic filter will not operate properly and an audible loss of high frequency content will result. Low level high frequency information will not cause the dynamic filter to open up at all in this situation. If the threshold is set too low, the noise floor of the audio source itself will tend to hold the dynamic filter open and a perceived "breathing" effect will occur with any subtle change in signal level, even in the mid-band information. Therefore, it is important for proper operation of a single-ended noise reduction system that the threshold be set properly for the level of the background noise relative to the signal level.

Simplistic attempts to provide a threshold control circuit that has been de-sensitized to the changes in background noise, which would reduce the requirement for user adjustments of the threshold with varying audio sources, have been used in some signal processors. One such circuit is disclosed in my U.S. Pat. No. 4,893,099 in which the filter control for dynamic filtering is derived after the output of a compressor. By having a compression circuit in front of the filter control block, the filter control can be de-sensitized to changes in the input signal. This will increase the range in which the dynamic filter will operate with changes of the audio source without requiring an adjustment of the threshold. However, when utilizing this method, the filter responds to the envelope of the compressor output signal, and with a sudden transient the filter would increase it's sensitivity dramatically and would again cause the filter to be held open.

Another method of desensitizing the threshold control circuit employs a limiter circuit with a high ratio before the filter control block instead of a compressor with only a 2:1 ratio. This suffers not only the same undesirable side effect resulting with use of a compressor, but introduces a new problem in that, when the noise level of the audio source increases by about 10 dB, the filter will remain open and no longer operate.

It is therefore an object of the invention to provide a method of controlling the threshold of a single-ended noise reduction system with a DC control to have an intelligent threshold circuit that will determine the DC control signal fed to the dynamic filter and downward expander circuits based on determining the level of the background noise present in the audio signal. Another object of the present invention is to provide a circuit having large enough range of operation such that changing the audio source from an extremely noisy signal, such as a video cassette, to a far less noisy signal, such as a compact disc, will not inhibit proper tracking of the automatic threshold circuit or the performance of the noise reduction system. It is a further object of this invention to provide a circuit which is capable of detecting the level of the noise floor even in the presence of an audio signal. Another object of this invention is to provide a method which may be implemented in Digital Signal Processing and modeled with a software algorithm.

SUMMARY OF THE INVENTION

In accordance with the invention, an automatic threshold circuit is provided for determining the optimal threshold level for a signal processor.

The automatic threshold circuit does not reduce the sensitivity of the detection block, but instead provides a method for deriving a DC control signal equivalent to the amplitude of the background noise and then using that DC control signal to control the threshold point of the dynamic filter and downward expander. This could also be used to control thresholds of other signal processors which might require setting the threshold relative to the level of background noise.

The dynamic noise reduction circuit disclosed in my U.S. Pat. No. 4,606,044 uses a DC control signal for setting the threshold point for the dynamic filter. The same DC control signal can be used for setting the point of downward expansion or for controlling multiple dynamic filters.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
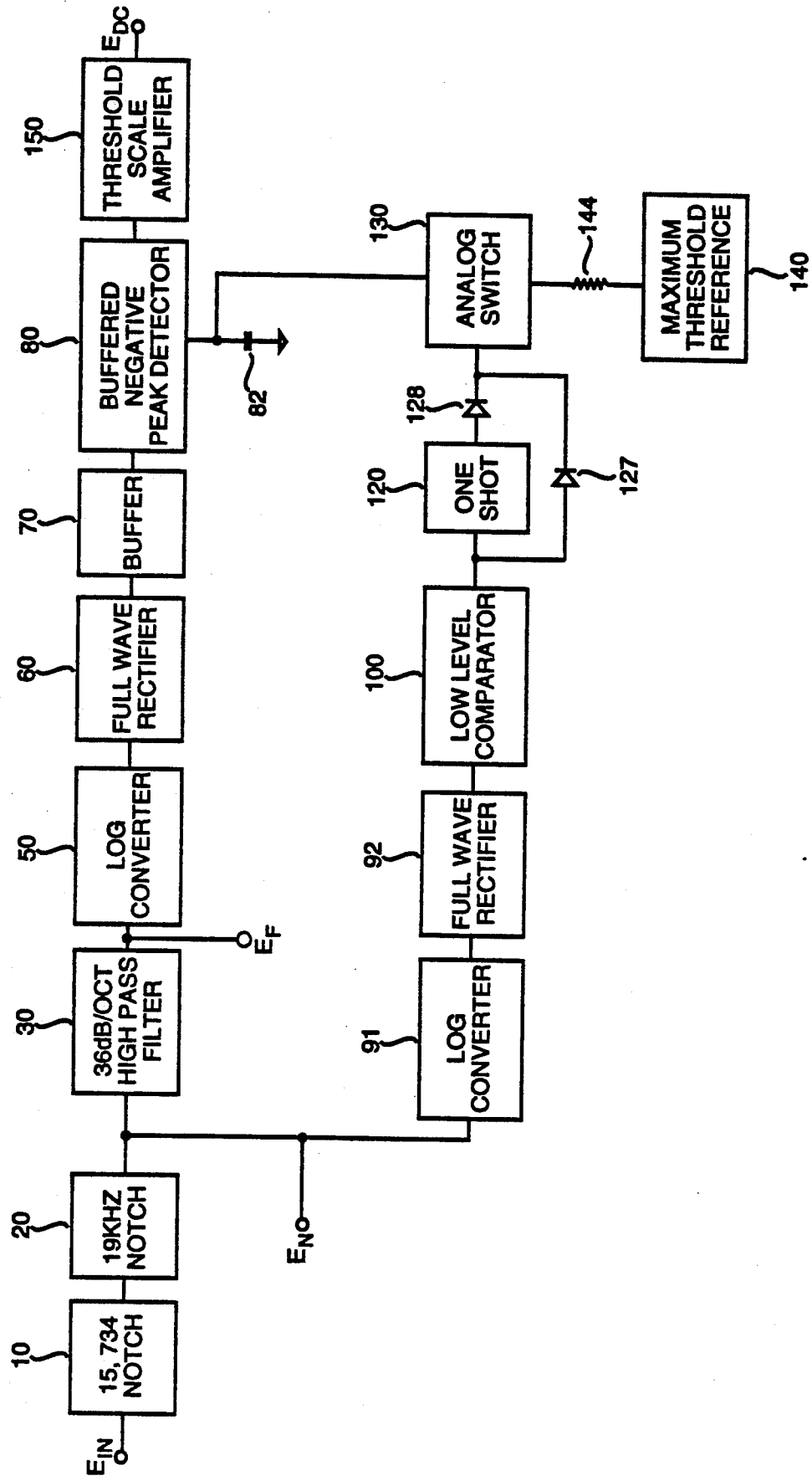
FIG. 1 is a block diagram of a preferred embodiment of the automatic threshold circuit.
Figure 2:
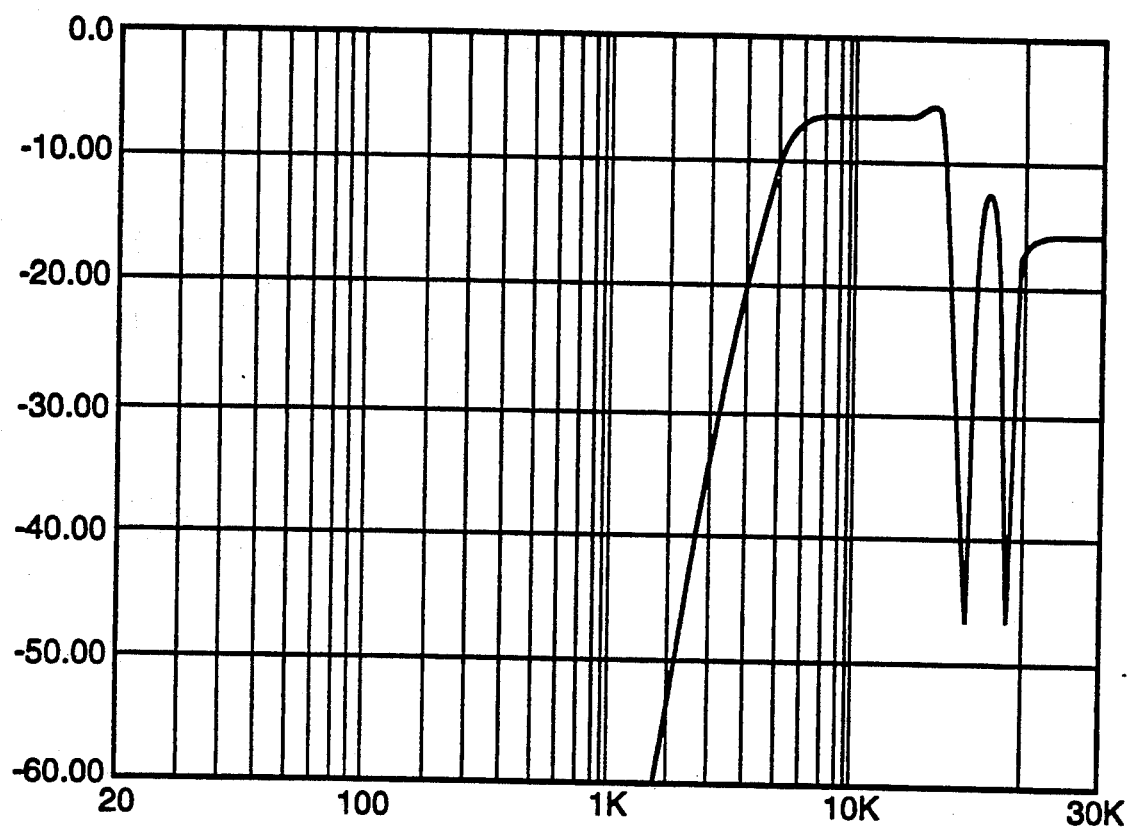
FIG. 2 is an amplitude versus frequency graph illustrating the characteristics of a 36 dB/octave high pass filter of the automatic threshold circuit of FIG. 1.

Referring to FIG. 1, audio is applied to the input of a 15,734 Hz notch filter 10. This notch filter is at the television horizontal sweep frequency and is provided to guard against any leakage of that sweep frequency should the automatic threshold circuit be connected to the audio output of a television or VCR. Such leakage may cause the detection circuit to provide an inaccurate reading of the actual amplitude of the background noise. This notch filter is then followed by a 19 KHz notch filter 20 which is at the frequency of the pilot tone for FM broadcast. This filter is provided to guard against any leakage of the FM pilot tone frequency should the device be connected to the output of a device incorporating FM audio signals. Leakage of this frequency will also cause the detection circuit to provide an inaccurate reading of the actual amplitude of the noise. These two blocks can be omitted should the automatic threshold circuit be used with an device not incorporating television or FM signals, such as cassette music, compact discs, digital recordings, and the like. A 36 dB per octave high pass filter 30 follows these notch filters and is set with a −3 dB point at approximately 6 KHz and has a very steep cutoff slope. This allows for the detection of specifically high band information from approximately 6 KHz up to 20 KHz, as is illustrated on the amplitude vs frequency graph of FIG. 2. The output of this filter 30 is then processed through a log converter 50 and a full wave rectifier 60 and filtered to provide an accurate representation in volts per decibel of the output signal from the 36 dB per octave high pass filter 30. This allows derivation of a DC level equivalent to the signal present in a select portion of the audio spectrum, in this case the high band. In the absence of any audio, the noise present in this high band would be present at the output of the buffer 70 and would provide a DC signal representative of the level of the noise present. The output of the buffer circuit 70 is fed to the input of a buffered negative peak detector 80.

The audio input is also provided broad-band to a second log converter 91. This log converted signal is fed to a full wave rectifier 92 and filtered to provide a DC level equivalent to the amplitude of the audio signal. This DC signal level, which is a broad-band representation of the audio level present, is applied to a low level comparator 100. This low level comparator 100 has a threshold point of approximately −50 dBu, where 0 dBu=0.775V RMS. This means that if the signal level drops below −50 dBu, the output of the comparator goes high. When the comparator is high, this will turn on the analog switch through diode 128. When the audio signal level exceeds −50 dBu, the output of the comparator 110 flips low and triggers the one shot 120 which fires a pulse for approximately 20 mS and holds the analog switch 130 closed for an additional 20 mS. When turned on, analog switch 130 applies the maximum threshold reference, typically set at a voltage equivalent to −50 dBu, through a resistor 144 to the buffered negative peak detector 80. The buffer 70 in the noise chain will have priority. For example, if the audio signal level should exceed −50 dBu momentarily, causing the one shot 120 to fire and hold the analog switch 130 closed for an additional 20 mS, and the output of the buffer 70 signal measured −60 dBu, the DC voltage on a capacitor 82 would be held at −60 dBu even though the maximum threshold reference 140 is set at −50 dBu. However, should the signal level at the buffer 70 output be up equivalent to −30 dBu, then capacitor 82 will never charge above the maximum threshold reference of −50 dBu. With the onset of audio, the capacitor 82 will charge to the highest reference equivalent to the output of the buffer 70. When the analog switch 130 turns off, assuming the signal exceeds a −50 dBu reference point, the voltage held on capacitor 82 will be equivalent to the most negative voltage that appears at the buffer 70 output. In the absence of any high frequency information at the output of the high pass filter 30, the output of the buffer 70 will be representative of the DC level equivalent to the noise level present in the audio signal. When listening to dynamic music, pauses in the high band information will cause the buffer 70 output to drop down to a level equal to the noise floor of the audio source. When this occurs, the voltage held on capacitor 82 will be reduced to the most negative voltage present at the output of the buffer 70. At the commencement of music, the one shot 120 will fire and the voltage on capacitor 82 will charge up to the highest signal present at the output of the buffer 70 without exceeding the maximum threshold reference. Then, as pauses in the high frequency information occur, the voltage on capacitor 82 will discharge to the most negative point equivalent to the buffer 70 output. The output from the buffered negative peak detector 80 is then applied to a threshold scale amplifier 150 which converts this to the proper voltage $E_{DC}$ required to control the threshold of the noise reduction system. As the audio signal drops below a −50 threshold point, the analog switch 130 will close due to the fact that the comparator 100 will turn on, and this voltage may charge up slightly. However, this will occur typically at the fade out of a music source. Due to the fact that the music is fading out, the output from the high band is typically less than −50. Therefore, when the analog switch 130 closes, it will be a fairly accurate representation of the noise floor present. In the case where the analog switch 130 will close and the voltage on capacitor 82 should considerably exceed the noise floor present, if the audio signal level present in the high band is close to the nominal signal level there will be enough energy present to open the dynamic filter of the noise reduction system. The instant that the high band information is reduced, the voltage at the output of the negative peak detector 80 will drop instantly to that equivalent to the noise floor. Therefore, there should be no apparent loss of high frequency information.

Figure 3:
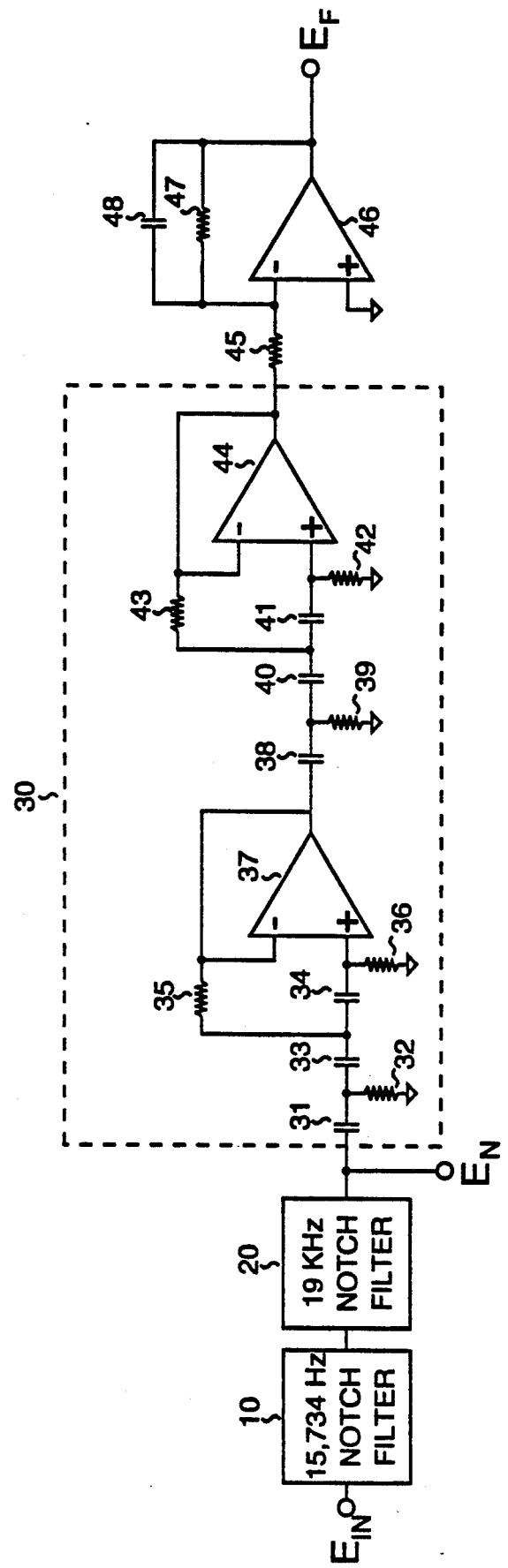
FIG. 3 is a schematic diagram of a 36 dB/octave high pass filter of the automatic threshold circuit of FIG. 1.

FIG. 3 is a schematic and partial block diagram of the 15,734 Hz notch filter 10, 19 KHz notch filter 20 and the 36 dB per octave high pass filter 30. Audio is applied at $E_{IN}$ to the notch filter 10. The notch filters 10 and 20 are commonly known and used in the art, and can be either a simple LC notch filter or an op-amp notch filter, described in any number of common op-amp cookbooks typically providing a minimum of 25-30 dB of attenuation at the notch frequency. The output of the 19 KHz notch filter 20, designated as $E_N$, feeds the input to the 36 dB per octave high pass filter 30. An operational amplifier 37 and its associated components, capacitors 31, 33, and 34 and resistors 32, 35 and 36, forms an 18 dB per octave high pass filter that is series connected with a second, virtually identical 18 dB per octave high pass filter consisting of capacitors 38, 40 and 41 and resistors 39, 42 and 43 with a buffer op-amp 44. The output signal from the buffer op-amp 44 is thus a 36 dB per octave slope using the component values shown in Table 1 below. The output of high pass filter 30 is connected to a resistor 45 which feeds another op-amp 46. A resistor 47 provides feedback and a capacitor 48 provides op-amp stability. This network provides approximately 8.5 dB of gain at the output of the high pass filter 30. The output $E_f$ of this network is the input to the log converter 50 shown in FIG. 4.

Capacitor 51 provides AC coupling to guard against DC offset in the output of the log converter 50. A resistor 52 is a voltage-to-current converter. Another resistor 56 sets the absolute gain of the log converter 50. The diodes 54 and 55 perform the logarithmic conversion. The output of an op-amp 53 is a bipolar log converted signal which is then full-wave rectified by op-amps 62 and 66 with their associated gain resistors 61, 63, 64 and 65 and rectifying diodes 67 and 68. A capacitor 69 provides filtering for the full-wave rectified log converted signal, while a resistor 71 sets the time constant for the release characteristics of the log converted, full-wave rectified filtered signal.

Buffer block 70 includes an op-amp 72 which is a voltage follower op-amp set up to buffer the output of the log converted, rectified, filtered signal. The output of the op-amp 72 feeds the positive input of another op-amp 81 in the buffered negative peak detector 80. The op-amps 81 and 85, along With a feedback resistor 84, rectifying resistors 83 and 86 and the capacitor 82 form a buffered negative peak detector which is commonly known in the art. The output of the amplifier 85 will provide a DC signal equivalent to the energy level in the high band spectrum of the audio signal applied to the input $E_{IN}$. This DC signal is then applied to the input of an op-amp 155 which provides the proper scale and offset required to interface with the DC threshold input of a standard noise reduction system such as the HUSH TM currently manufactured by Rocktron Corporation. A feedback resistor 154 and an input resistor 151 determine the gain of the amplifier 155 and an offset resistor 152 connected to 12 volts provides the proper DC offset for the required DC operating range to interface with the noise reduction system. A capacitor 153 provides op-amp stability.

Figure 4:
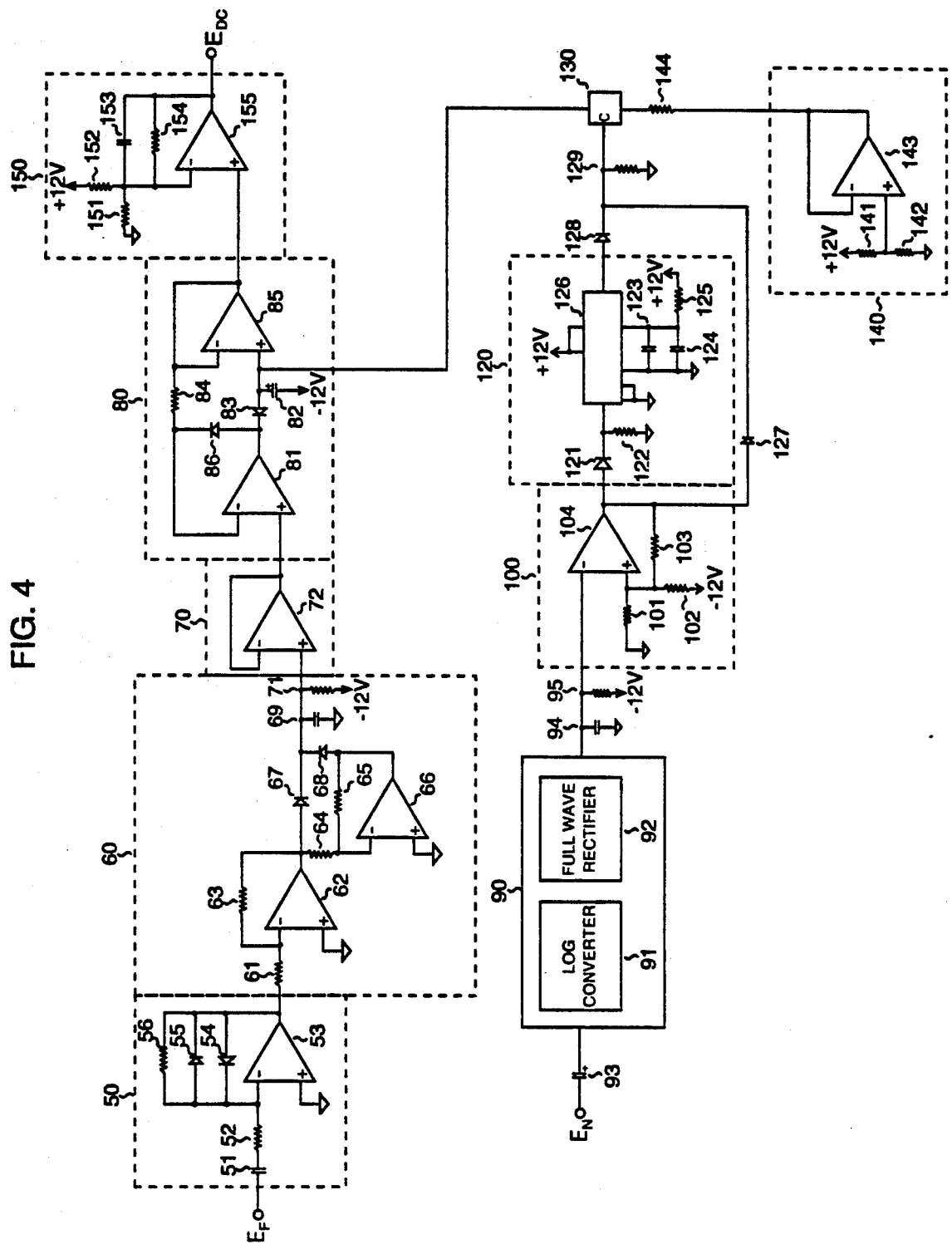
FIG. 4 is a schematic diagram of the noise and audio detection branches of the automatic threshold circuit of FIG. 1.

Referring back to FIG. 3, the output Ex of the 19 KHz notch filter 20 is also applied at capacitor 93 shown in FIG. 4. Block 90 contains a log converter 91 and a full wave rectifier 92 virtually identical to that disclosed in blocks 50 and 60. The output of the full-wave rectified signal is filtered by a capacitor 94, and a resistor 95 sets the release characteristics of this log converted, full-wave rectified signal. The DC voltage that appears on the capacitor 94 will be equivalent to the broadband energy of the audio signal present at the input $E_{IN}$. This log converted DC signal is connected to the negative input of a comparator 104. Resistors 101 and 102 form a voltage divider to determine the trip point of the comparator 104 and a resistor 103 provides hysteresis to avoid any undesirable switching from the comparator 104. These components are typically selected to provide a voltage level for the comparator 104 equivalent to −45 to −50 dBu signal level. The output of the comparator 104 feeds both diodes 121 and 127. The diode 121 is connected to the input of a monostable multivibrator 126, which is set up as a negative edge triggered one shot. Capacitors 123, 124 and a resistor 125 determine the time period for the one shot 120. The output of the one shot 120, which would be a positive-going pulse, is fed through a diode 128. A resistor 129 provides bias for the analog switch 130. A positive voltage at the anode of either diode 127 or 128 will turn the analog switch 130 on, providing a connection between the positive input of the op-amp 85 and the resistor 144. The maximum threshold reference circuit 140 is comprised of resistors 141 and 142 which form a voltage divider setting a DC voltage equivalent to the maximum threshold reference, typically between −45 and −50 dBu. This voltage divider is connected to the positive input of an op-amp 143 connected as a voltage follower. This DC signal at the output of the op-amp 143 is then connected to the resistor 144 which, when there is a positive voltage on the control port to the analog switch 130, will connect charging current to the capacitor 82 in the buffered negative peak detector 80.

Therefore, as previously described, an audio signal applied to $E_{IN}$ of FIG. 1 will result in a DC control signal at $E_{DC}$ representative of the optimal threshold level, based on the level of the noise floor of the audio signal, for controlling the dynamic filter and downward expander circuits of a noise reduction system.

In one preferred embodiment of the automatic threshold circuit, the circuit components are as follows:

TABLE 1

| Resistor No. | K Ohms | Resistor No. | K Ohms | Capacitor No. | Microfarads |
|---|---|---|---|---|---|
| 32 | 12 | 84 | 510 | 31 | .0018 |
| 35 | 4.7 | 95 | 6200 | 33 | .0018 |
| 36 | 82 | 101 | 5.6 | 34 | .0018 |
| 39 | 12 | 102 | 33 | 38 | .0018 |
| 42 | 82 | 103 | 1000 | 40 | .0018 |
| 43 | 4.7 | 122 | 10 | 41 | .0018 |
| 45 | 12 | 125 | 300 | 48 | .001 |
| 47 | 33 | 129 | 20 | 51 | |
| 52 | 10 | 141 | 240 | 69 | .22 |
| 56 | 2200 | 142 | 8.2 | 82 | 22 |
| 61 | 20 | 144 | .39 | 94 | .1 |
| 63 | 120 | 151 | 10 | 123 | .47 |
| 64 | 20 | 152 | 300 | 124 | .33 |
| 65 | 20 | 154 | 75 | 153 | .1 |
| 71 | 470 | | | | |

| IC NO. | TYPE | DIODE NO. | TYPE |
|---|---|---|---|
| 37 | TL064 | 54 | 1N4148 |
| 44 | TL064 | 55 | 1N4148 |
| 46 | TL064 | 67 | 1N4148 |
| 53 | TL064 | 68 | 1N4148 |
| 62 | TL064 | 83 | 1N4148 |
| 66 | TL064 | 86 | 1N4148 |
| 72 | TL064 | 121 | 1N4148 |
| 81 | TL064 | 127 | 1N4148 |
| 85 | TL064 | 128 | 1N4148 |
| 104 | TL064 | | |
| 126 | MC14528 | | |
| 130 | D0212 | | |
| 155 | TL064 | | |

It must be noted that modifications can be made to the disclosed circuit while maintaining equivalent results. For example, the polarity of both the high band and broad band detection circuits could be reversed and a positive peak detector could be inserted in place of the negative peak detector disclosed. Also, it is possible to monitor an alternative frequency range other than the 6 to 20 KHz range disclosed for the high band detection circuit.

Thus, it is apparent that there has been provided, in accordance with the invention, an intelligent automatic threshold circuit and method of processing a signal that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A circuit for conditioning an input signal containing audio and noise components comprising:
   means for deriving from said input signal a first DC signal proportionate to the decibel level of high band information in said input signal;

means for deriving from said input signal a second DC signal proportionate to the amplitude of said input signal;

means responsive to said second DC signal for providing a preselected maximum threshold reference when said second DC signal drops below a preselected threshold and for providing said preselected maximum threshold reference for a predetermined time period when said second DC signal rises above said preselected threshold;

means having a first input for receiving said first DC signal and a second input for receiving said maximum threshold reference to provide a peak detected signal; and means connected to said receiving means second input for maintaining said receiving means second input at a level equal to the most negative level of said first DC signal when said maximum threshold reference is not received at said second input and for maintaining said receiving means second input at a level equal to the most positive level of said first DC signal but not greater than said preselected maximum threshold reference when said maximum threshold reference is received at said second input.

2. A circuit for conditioning an input signal containing audio and noise components comprising:

means for high pass filtering said input signal to provide a high band information signal;

means for converting said high band information signal to provide a first DC signal proportionate to the decibel level of said high band information signal;

means for converting said input signal to provide a second DC signal proportionate to the amplitude of said input signal;

means for comparing said second DC signal to a preselected threshold to provide a first level signal when said second DC signal drops below said threshold and to provide a second level signal when said second DC signal rises above said threshold;

means for switching having an input port, an output port and a control port:

means for providing a preselected maximum threshold reference to said input port of said switching means for passage as a maximum threshold output signal through said output port when said switching means is turned on;

means connected to said control port to turn on said switching means in response to said first level signal;

means connected to said control port to hold said switching means closed for a preselected time period in response to said second level signal;

means having a first input for receiving said first DC signal and a second input for receiving said maximum threshold output signal to provide a peak detected signal; and means connected to said receiving means second input for maintaining said receiving means second input at a level equal to the most negative level of said first DC signal when said switching means is open and for maintaining said receiving means second input at a level equal to the most positive level of said first DC signal but not greater than said preselected maximum threshold reference when said switching means is closed.

3. A circuit according to claim 1 further comprising means for blocking information at least one preselected frequency in said input signal from said high pass filtering means and from said input signal converting means.

4. A circuit according to claim 3, said at least one preselected frequency being the frequency of the FM broadcast pilot tone.

5. A circuit according to claim 3, said at least one preselected frequency being the television horizontal sweep frequency.

6. A circuit according to claim 3, said at least one preselected frequency being the FM broadcast pilot tone frequency and the television horizontal sweep frequency.

7. A circuit according to claim 1 further comprising means for conditioning said peak detected signal for compatability with a noise reduction system.

8. A circuit according to claim 1, said preselected threshold being approximately −50 dB.

9. A circuit according to claim 1, said maximum threshold reference being approximately −45 to −50 dB.

10. A circuit according to claim 1, said predetermined time period being approximately 20 mS.

11. A process for conditioning an input signal containing audio and noise components comprising the steps of:

deriving from said input signal a first DC signal proportionate to the decibel level of high band information in said input signal;

deriving from said input signal a second DC signal proportionate to the amplitude of said input signal;

providing a preselected maximum threshold reference when said second DC signal drops below a preselected threshold and providing said preselected maximum threshold reference for a predetermined time period when said second DC signal rises above said preselected threshold;

controlling said first DC signal in response to said maximum threshold reference to provide a peak detection input signal at a level equal to the most negative level of said first DC signal when said maximum threshold reference is not provided and at a level equal to the most positive level of said first DC signal but not greater than said preselected maximum threshold reference when said maximum threshold reference is provided; and providing a peak detected signal proportionate to said peak detection input signal.

12. A process for conditioning an input signal containing audio and noise components comprising the steps of:

high pass filtering said input signal to provide a high band information signal;

converting said high band information signal to provide a first DC signal proportionate to the decibel level of said high band information signal;

converting said input signal to provide a second DC signal proportionate to the amplitude of said input signal;

comparing said second DC signal to a preselected threshold to provide a first level signal when said second DC signal drops below said threshold and to provide a second level signal when said second DC signal rises above said threshold;

providing a preselected maximum threshold reference when said second DC signal drops below a preselected threshold and providing said preselected maximum threshold reference for a predetermined time period when said second DC signal rises above said preselected threshold;

controlling said first DC signal in response to said maximum threshold reference to provide a peak detection input signal at a level equal to the most negative level of said first DC signal when said maximum threshold reference is not provided and at a level equal to the most positive level of said first DC signal but not greater than said preselected maximum threshold reference when said maximum threshold reference is provided; and providing a peak detected signal proportionate to said peak detection input signal.

13. A process according to claim 11 further comprising the step of blocking information at least one preselected frequency from said input signal before deriving said first and second DC signals.

14. A process according to claim 13, said at least one preselected frequency being the frequency of the FM broadcast pilot tone.

15. A process according to claim 13, said at least one preselected frequency being the television horizontal sweep frequency.

16. A process according to claim 13, said at least one preselected frequency being the FM broadcast pilot tone frequency and the television horizontal sweep frequency.

17. A process according to claim 11 further comprising the step of conditioning said peak detected signal for compatability with a noise reduction system.

18. A process according to claim 11, said preselected threshold being approximately −50 dB.

19. A process according to claim 11, said maximum threshold reference being approximately −45 to −50 dB.

20. A circuit according to claim 11, said predetermined time period being approximately 20 mS.

21. A circuit for conditioning an input signal containing audio and noise components comprising:

means for sensing in a small portion of said input signal the presence of low level noise components at high band audio frequencies;

means for deriving a DC control signal corresponding to said sensed low level noise components; and means for dynamically determining a threshold level set-point of said DC control signal in response to said input signal.

22. A process for conditioning an input signal containing audio and noise components comprising the steps of:

sensing in a small portion of said input signal the presence of low level noise components at high band audio frequencies;

deriving a DC control signal corresponding to said sensed low level noise components; and dynamically determining a threshold level set-point of said derived DC control signal in response to said input signal.

* * * * *